United States Patent [19]

Morimura et al.

[11] Patent Number: 4,915,241

[45] Date of Patent: Apr. 10, 1990

[54] SYNTHETIC RESIN BOTTLE FURNISHED WITH HANDGRIP AND METHOD FOR MANUFACTURING THE SAME

[75] Inventors: Akihito Morimura, Tokyo; Shinichi Miyazaki, Tokyo; Yosuke Yasuda, Tokyo; Masaki Miura, Kawasaki, all of Japan

[73] Assignee: Toyo Seikan Kaisha Ltd., Tokyo, Japan

[21] Appl. No.: 163,108

[22] Filed: Mar. 2, 1988

[30] Foreign Application Priority Data

Mar. 9, 1987 [JP] Japan .................................. 62-52061
Jul. 16, 1987 [JP] Japan .................................. 62-175966
Jan. 11, 1988 [JP] Japan .................................. 63-2522

[51] Int. Cl.$^4$ .................... B65D 23/10; B65D 25/28
[52] U.S. Cl. ............................ 215/100 A; 220/94 R; 220/94 A
[58] Field of Search ................. 215/100 A, 100 R; 220/94 A, 94 R

[56] References Cited

U.S. PATENT DOCUMENTS

| | | | |
|---|---|---|---|
| 3,140,329 | 7/1964 | Nutting | 215/100 A X |
| 4,257,525 | 3/1981 | Thompson | 215/100 A |
| 4,363,415 | 12/1982 | Rainville | 215/100 A |
| 4,368,826 | 1/1983 | Thompson | 215/100 A |
| 4,372,454 | 2/1983 | Thompson | 215/100 A |
| 4,727,997 | 3/1988 | Nakamura et al. | 220/94 A X |

FOREIGN PATENT DOCUMENTS 889343 2/1962 United Kingdom ........... 215/100 A

Primary Examiner—Sue A. Weaver
Attorney, Agent, or Firm—Wenderoth, Lind & Ponack

[57] ABSTRACT

A synthetic resin bottle has a main body of synthetic resin molded in accordance with biaxial orientation. A handgrip is provided which has an attaching section surrounding a handgrip supporting portion of the main body, and a handgrip section extending outwardly and integrally from the attaching section. The handgrip is molded by means of injection molding to attach integrally to the body.

3 Claims, 12 Drawing Sheets

SYNTHETIC RESIN BOTTLE FURNISHED WITH HANDGRIP AND METHOD FOR MANUFACTURING THE SAME

FIELD OF THE INVENTION

This invention relates to a synthetic resin bottle furnished with a handgrip, and particularly to a saturated polyester resin bottle furnished with a handgrip and a method for manufacturing the same.

DESCRIPTION OF THE RELATED ART

In general, a blow molded bottle mode of saturated polyester resin (generally called "PET bottle" and hereinafter referred thereto) is suitable for a large-sized bottle, because mechanical strength of such bottle is elevated by biaxial orientation at the time when the bottle is molded. Furthermore, since PET bottle has originally excellent characteristic features such as no exudation of harmful materials such as solvent and the like, no production of harmful gas in case of incineration of such bottle after discharging it, and the like features, such PET bottles have been used for wide applications.

In this connection, however, there is such a remarkable tendency that PET bottle becomes one having a large size in view of easy handling thereof, so that a PET bottle furnished with a handgrip is desired. While such handgrip is integrally molded with a bottle main body section at the time of blow molding of a large-sized bottle in general, it is very difficult to mold a large-sized bottle furnished with a handgrip. More specifically, in case of such saturated polyester resin bottle, it whitens as a result of crystalization and strength of the bottle is easily lost. Furthermore, the above-mentioned biaxial orientation is usually carried out in the case of blow molding in order to elevate the strength of such bottle, but as a result of adopting such a process as described above, it became very difficult to blow mold a handgrip section together with its bottle main body. Accordingly, in this connection, there have proposed such methods that a handgrip section has been previously molded as a separate body from its bottle main body section, the molded handgrip section has been placed in a blow molding die, and said molded handgrip section is integrated with a parison for molding the bottle main body in case of blow molding thereof by, for example, Japanese unexamined Laid-open Nos. 64948/1981 and 64949/1981 as well as Japanese unexamined laid-open Publication No. 74438/1981.

In the above respective methods, however, since a handgrip molded as a separate body has in general, remarkably indeterminate shape, an operation for locating accurately such handgrip in said blow molding die at a prescribed position is very difficult, so that there are many cases where continuous operations are significantly hindered by such locating operation.

Moreover, there are such problems as slight discrepancies in locating a handgrip results in the frequent occurence of defective bottles furnished with an inaccurately positioned handgrip being produced as final products, resulting in high costs.

OBJECTS AND SUMMARY OF THE INVENTION

Accordingly, the present invention contemplates to solve the problems as described above.

It is an object of the present invention to mold a handgrip by injection molding to form integrally said handgrip with a bottle main body prepared by blow molding.

More specifically, the present invention provides a synthetic resin bottle furnished with a handgrip comprising a molded synthetic resin bottle main body with biaxial orientation, and the handgrip composed of an attaching section surrounding a handgrip supporting portion of said bottle main body and a handgrip section extending outwardly and integrally from said attaching section, and said handgrip being molded by means of injection molding thereby to attach integrally the resulting handgrip to the bottle main body.

Another object of the present invention is to provide a synthetic resin bottle furnished with a handgrip having a construction in which the attaching section is a neck attaching section surrounding the neck of the bottle main body.

A further object of the present invention is to provide a synthetic resin bottle furnished with a handgrip having a construction in which the bottle main body has a concave into which user's fingers are insertable on a side of said bottle main body in its holding posture.

Still another object of the present invention is to provide a synthetic resin bottle furnished with a handgrip having a construction in which handgrip supporting portions or a handgrip supporting portion are/is defined on the upper and/or lower portions or a portion with respect to the above described concave.

In the above-mentioned synthetic resin bottles furnished with handgrip, each of the handgrips has an engagement construction by which said handgrip is fixedly attached to the bottle main body on the handgrip supporting portion or portions of said bottle main body.

A method for manufacturing the aforesaid synthetic resin bottles furnished with handgrip comprises the steps of molding a synthetic resin bottle main body having a biaxial orientation in accordance with a usual blow molding method; placing an injection molding die outside said bottle main body; and injecting a molten resin for handgrip into said channels for resin; said injection molding die having a split cavity of a substantially identical profile with a contour of said bottle main body involving a handgrip attaching section, a channel for resin corresponding to said handgrip attaching section being concavely defined on said split cavity, and furthermore another channel for resin corresponding to the profile of the handgrip extending outwardly from said handgrip attaching section.

In the above method, there is a case where it is required to add the above-mentioned steps a further step of applying an internal pressure which withstands its injection molding pressure being applied from the outside to said bottle main body prior to injecting a resin for handgrip into said channels for resin.

According to the present invention, since a synthetic resin bottle furnished with a handgrip comprises a synthetic resin bottle main body molded in accordance with biaxial orientation, and the handgrip composed of an attaching section surrounding a handgrip supporting portion of said bottle main body and a handgrip section extending outwardly and integrally from said attaching section, and said handgrip being molded by means of injection molding thereby to attach integrally the resulting handgrip to said bottle main body, it becomes scarcely necessary for considering an arrangement of the above described indeterminately shaped handgrips. In other words, such arrangement is effected in opening and closing operations for an ordinary injection molding die outside a bottle main body. Accordingly, the arrangement in the present invention scarcely disturbs high-speed and automated operations in the manufacture of bottles furnished with the handgrip as described in detail hereinbelow.

BRIEF DESCRIPTION OF THE DRAWINGS

FIGS. 1A–E are schematic explanatory views illustrating a molding process for a bottle main body according to the present invention in which

DETAILED DESCRIPTION OF THE PREFERRED EMBODIMENTS

Several embodiments of the present invention will be described hereinbelow by referring to the accompanying drawings.

First of all, a PET bottle main body is molded in accordance with biaxial orientation blow molding of polyethylene terephthalate as in a conventional method.

Figures 1A, 1B:
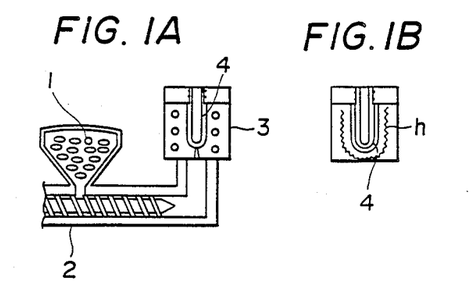
FIG. 1A is a schematic view of a molding resin material being hot-melted in an extruder for shaping in an associated mold.
FIG. 1B is a schematic view of a heater for softening a preform.
Figure 1C:
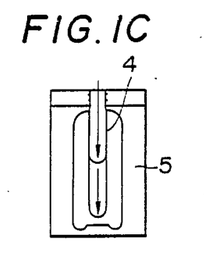
FIG. 1C is a schematic view of a blow molding die for axially stretching the biaxially oriented softened preforms.
Figure 1D:
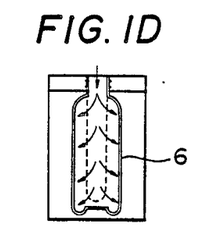
FIG. 1D is a schematic view of the blow molding die of FIG. 1A in which air is blown for further stretching and molding the softened preforms.
Figure 1E:
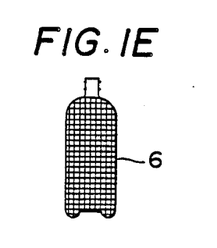
FIG. 1E is a schematic view of the resulting axially stretched biaxially oriented bottle produced by the apparatus of FIGS. 1A–D.

More specifically, for example, as shown schematically in FIGS. 1(a)–(e), a molding resin material 1 is hot-melted in an extruder 2, and then a preform 4 is shaped from the molten resin material in a mold 3 (FIG. 1(a)). Thereafter, the preform 4 is heated and softened by means of a heater h (FIG. 1(b)), the preform thus softened is stretched into, for example, twice its original length in a blow molding die 5 (FIG. 1(c)), air is blown into the thus stretched preform to mold a biaxially oriented bottle main body 6 (FIG. 1(d)), and the resulting bottle main body is taken out (FIG. 1(e)).

Figure 2:
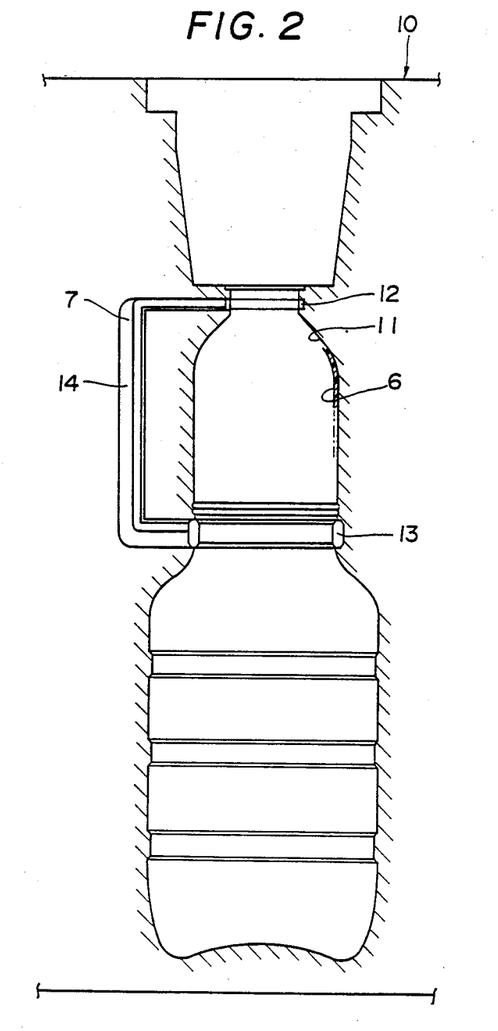
FIG. 2 is a sectional view showing an injection molding die for a handgrip section according to the present invention.

The axially stretched, biaxially oriented blow molded bottle main body 6 as described above is then furnished with a handgrip by injection molding. In this connection, a molding die 10 for the injection molding is as shown in FIG. 2.

The molding die 10 is a split die having a split cavity 11, the profile of which coincides substantially with a contour of the bottle 6.

Channels 12 and 13 for resin are concavely defined in said split cavity 11 in such a manner that a portion encompassing a neck of said bottle main body is surrounded by the channel 12 and a constricted portion reaching a body of said main body is similarly surrounded by the channel 13.

An extended channel 14 (for resin), the shape of which forms a profile of the handgrip itself, extends continuously from the resin channels 12 and 13.

In the actual injection molding for the handgrip, the injection molding die having the above construction is disposed on the outside of the bottle main body 6 prepared by said blow molding, and a suitable position of the extended resin channel 14 which comprises a space for the handgrip to be formed is selected as described in detail hereinbelow to inject a molten resin into a spacing defined by the channels 12, 13 and 14, whereby the handgrip 7 is integrally molded with the bottle main body 6.

A suitable temperature of this injecting resin material depends upon resins to be used, but it ranges generally from 180° to 260° C. On the other hand, a temperature of the bottle main body 6 is an ordinary temperature with respect to said high temperature resin, so that the injecting resin welds instantly to the bottle main body to be in one united body. Supporting portions for said handgrip on the bottle main body 6 may be disposed, for example, on either of the neck or the body thereof, or they may be two constricted portions located on the upper and lower sides of said body with a spacing corresponding to a distance defined between the opposite ends of the handgrip dependent upon a construction of said handgrip 7.

According to circumstances, there is a case where said injection molding die 10 may be the one which does not surround the entire circumference of the bottle main body 6 as in the above embodiment, but surrounds at least the handgrip 7 and the attached portions to the bottle main body 6. In this case, since an injecting resin pressure is comparatively high and particularly there is such a fear that the bottle 6 is distorted in the channel 13 defined on the body of the bottle main body, it is required to prevent such distortion by applying previously an internal pressure which withstands said resin pressure to the bottle 6.

Next, an outline of one example of an actual continuous molding operation for a bottle furnished with a handgrip will be described herein.

Figure 3:
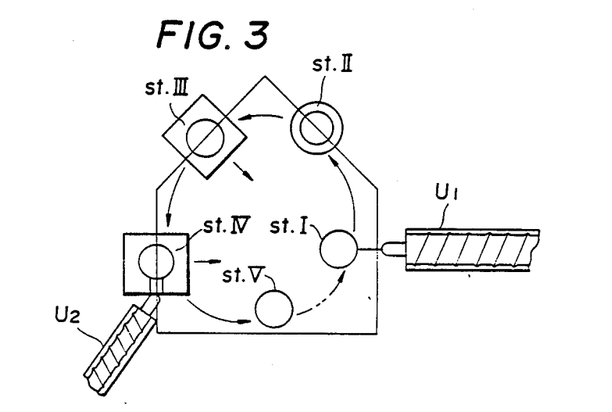
FIG. 3 is a schematic explanatory view showing an apparatus for carrying out the method according to the present invention.

FIG. 3 illustrates schematically the example wherein each molding operation which will be described hereinbelow is synchronously operated in sections or steps st. I–st. V in a cyclic manner.

First, a parison or preform for the above described bottle is shaped by means of an injection unit ($U_1$) in st.

I, and is heated in st. II. Then, the above described bottle 6 is molded in st. III which is a blow molding section for producing a biaxially oriented bottle. In st. IV, an injection molding die surrounding the bottle 6 is then disposed, an internal pressure (about 20-50 kg/cm²) is applied to the bottle, and injection is effected by means of an injection unit (U₂) to obtain a handgrip. The st. V is a section for taking out the bottle furnished with the handgrip which was molded in accordance with the above described operations.

In a specific example, a good bottle furnished with handgrip was obtained at an injection pressure of 10-100 kg/cm² in the case where HDPE is used as a material for the handgrip. However, if a wall of the bottle is thin, it is desirable for preventing production of defective molding by such a manner that the injection pressure is selected to be the same pressure with the internal pressure of a bottle in the injection molding die or a lower pressure. Of course, it is desirable to take the following matters into consideration dependent upon factors such as flow resistance on the outer surface of said bottle 6 as well as in the space defined by the resin channels 12, 13 and 14 formed concavely;

(i) Firstly, a hot runner is utilized as its runner in order to avoid also secondary finishing in a gate section with respect to the resin. This hot runner section has such a fashion that the periphery of the blow molding die is insulated by means of air or an insulation material is internally disposed therein.

(ii) A construction of the runner is determined by taking flow characteristics of a resin into consideration dependent upon the material for the handgrip to be used.

(iii) An initial pressure of such resin flowing into an injection molding die for the handgrip which is internally disposed on said blow molding die decreases gradually in general during the resin passes through its sprue runner (hot). With respect to such a matter that a resin which is injected into a gap defined between a rigid body and a non-rigid body to flow it thereinto does not invade the non-rigid body side and that a product of a prescribed shape is obtained from the resin, the above-mentioned pressure drop, i.e., the pressure loss derived from viscosity resistance and flowing velocity as well as temperature does not theoretically comply with a Law of Newtonian viscosity behavior. Accordingly, it is at least necessary for taking flow characteristics of resin in such runner into consideration and establishing such a condition which minimizes influence in an injection pressure with respect to the non-rigid body.

(iv) Assuming that said viscosity behavior does comply with the Newtonian Law, it is well known that inside the tubular runner, flowing velocity is zero at a wall of the tube, whilst it is maximum at the center, i.e., such flowing viscosity presents so-called parabolic form. In case of molding the handgrip as in the present invention, a position of an injection gate influences remarkably upon the non-rigid body. Particularly, it is indispensable that a condition which is determined by taking the characteristic feature of the above Paragraph (iii) into consideration in addition to injection pressure is established in case of forming a section to which is attached a handgrip to be installed on the body of a PET bottle. For this reason, in a design for the attaching section, an area of a PET bottle contacting portion is minimized for holding a handgrip, and a strip-like thickness is maintained for elevating flowing characteristics.

(v) According to an experimental example, when HDPE is used as a material for handgrip, it is preferable that such width and thickness are within the following range:

$$W/t \doteq 1/1 \sim \tfrac{1}{3}$$

(vi) When such fact that constricted portions in a body on the PET bottle side corresponding to the attaching sections are obtained in accordance with biaxially orientation molding method takes into consideration, it is preferable to comparatively thicken these portions. According to an experimental example, preferable is to maintain a required thickness $t = 0.3 \sim 1.5$ mm. In this connection, a design for the attaching section can maintain a certain thickness by making the surface area as small as possible. Accordingly, it is necessary for considering also balance in respect of the bottle design.

Figure 4:
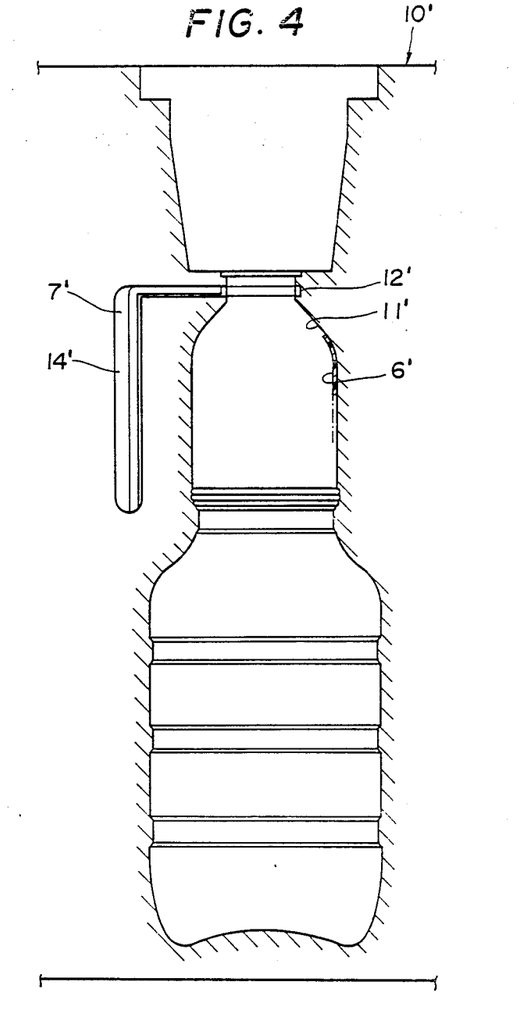
FIG. 4 is a sectional view showing an injection molding die for a handgrip section of another embodiment according to the present invention.

Next, another embodiment of the present invention is illustrated in FIG. 4 wherein reference character 12′ designates a similar channel for resin to that of the above described embodiment and the channel is concavely defined on a portion corresponding to the neck of a bottle main body 6′ in a split cavity 11′. Furthermore, an extended channel 14′ for resin extends continuously from said resin channel 12′ and the profile of which defines the contour of a handgrip main body 7′.

In this embodiment, it is not required to apply the above-mentioned additional pressure to the bottle main body 6′ in case of injection molding of a handgrip, because a diameter of the neck of the bottle main body 6′ is small and a thickness of the portion in question is generally thick.

Figure 5:
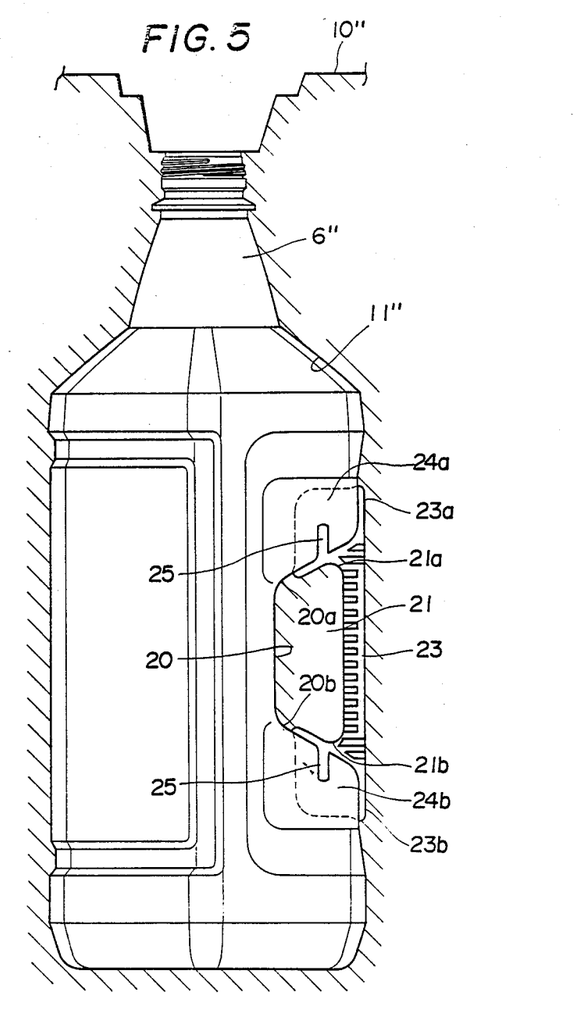
FIG. 5 is a sectional view showing an injection molding die for a handgrip of still another embodiment according to the present invention.
Figure 6:
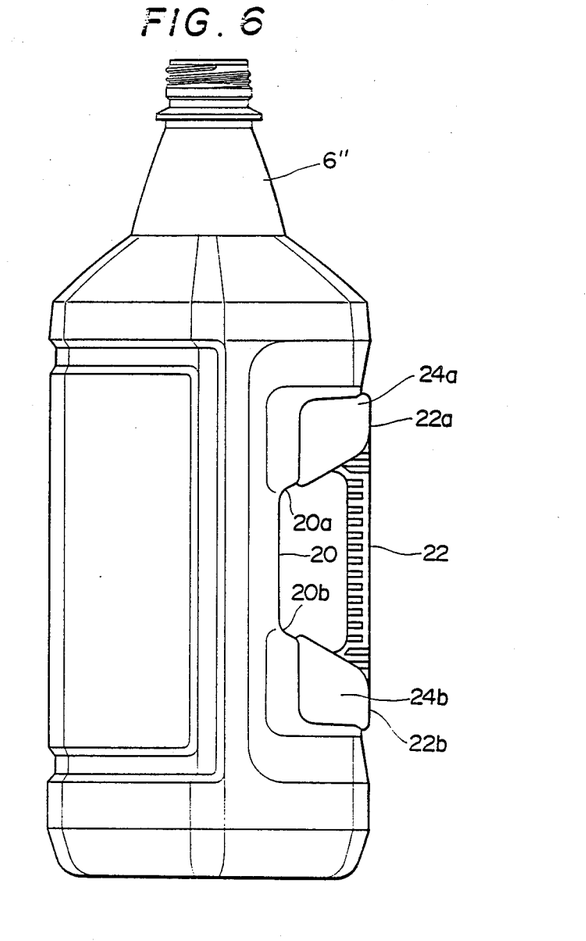
FIG. 6 is a front view showing a bottle made by the die of FIG. 5 furnished with a handgrip according to the present invention.

A still further embodiment is illustrated in FIGS. 5 and 6 wherein reference character 20 designates a concave which is defined on the body of a bottle main body 6′ and into which the user's fingers may be inserted.

A projection 21 corresponding to said concave 20 of the bottle 6″ protrudes inwardly in a split cavity 11″ of a molding die.

A channel 23 for resin having a size of handgrip 22 is bored through the molding die, and the resin channel 23 extending in a direction defined by connecting vertically upper and lower corner portions 21a and 21b at the basal parts of the projection 21 and along substantially the outer wall of the bottle 6″.

In the split cavity 11″, split cavity concaves 23a and 23b for handgrip supporting wall sections 22a and 22b and which reach a desired depth in each of upper and lower inclined walls 20a and 20b of the concave 20 are defined on the upper and lower parts of the resin channel 23, i.e., sections opposite to upper and lower handgrip supporting portions 24a and 24b positioned on the upper and lower parts of the concavity 20 in the bottle 6″, and these split cavity concavities are communicated with said resin channel 23.

Furthermore, concaved grooves 25 and 25 for preventing slipping out of handgrip in a side direction of the bottle main body which extends from said inclined walls 20a and 20b in lengthwise of the bottle 6″ are defined on portions opposite to said split cavity concaves 23a and 23b in the bottle 6″.

In actual injection molding of handgrip, the injection molding die 10″ having the above construction is disposed on the outside of the bottle 6″ prepared in accordance with the above described blow molding, a suitable position of the extended resin channel 23 which composes its handgrip section is selected as described hereinbelow, and a molten resin is injection into said channel to mold the handgrip 22, whereby this handgrip is incorporated with the bottle 6".

In case of this embodiment, it is necessary to apply previously an internal pressure which withstands an injecting resin pressure to the bottle 6" so as to prevent distortion of the bottle.

In the present embodiment, the handgrip supporting portion may be disposed on, for example, either the upper or the lower portion of said concavity 20 dependent upon the construction of said handgrip 22, strength of said supporting portion, capacity of the bottle 6" and the like.

In this case, a resin for the projection on the handgrip side which is injected into said concaved groove 25 to be filled therewith is increased in a complementary relationship with said concaved groove dependent upon length, depth and the like of the concaved groove 25, whereby a possibility of slipping out of said handgrip 22 can be decreased.

Furthermore, with respect to said inclined walls 20a and 20b. Various modifications such as one wherein the inclined direction of the wall is either allowed to inwardly diverge or to be horizontal, and the like modifications may be adopted. Moreover, there is such a modification that a semispherical concave is defined in place of said concaved groove 25 so far as draw of the molded bottle is not disturbed, or there is also such a modification that said concaved groove is defined as a through hole for attaining a perfect construction for preventing slipping out of the handgrip.

There is also such a case where the injection molding die 10 may be not the one which surrounds the circumference of the bottle 6 as described above, but one which surrounds minimally the handgrip 22 as well as the portions for supporting it with respect to the bottle 6".

Figure 7:
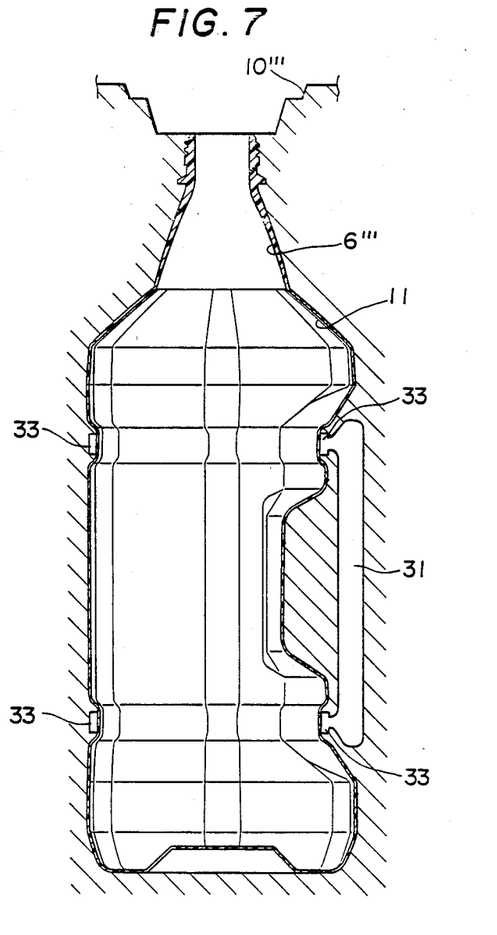
FIGS. 7 and 8 are similar views to those of FIGS. 5 and 6 illustrating still further embodiments of the present invention, respectively.
Figure 8:
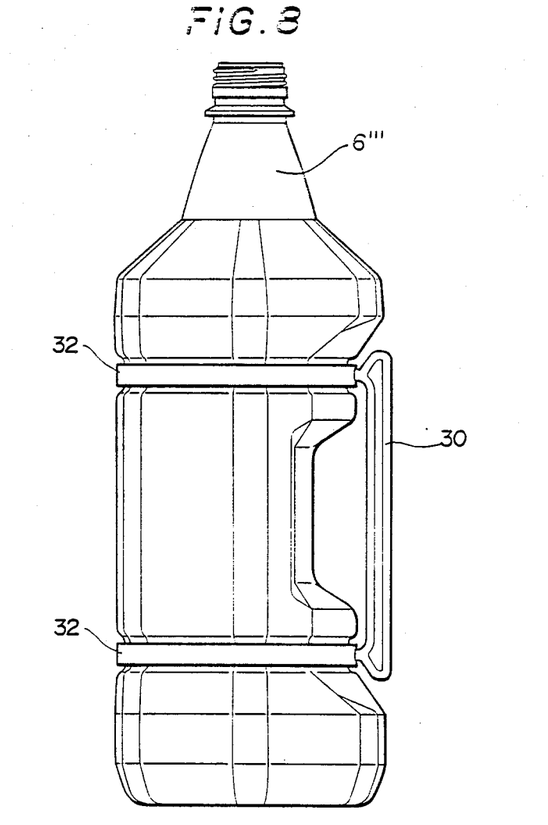

FIGS. 7 and 8 illustrate a further embodiment wherein only a construction of each handgrip section is slightly different from those of FIGS. 5 and 6 in which the bottle has the substantially same construction with that of FIGS. 5 and 6 except that the upper and lower circumferences of a body of the bottle main body are surrounded completely by resin channels 33 and 33 for forming handgrip attaching sections 32 and 32 communicating with a resin channel 31 for forming a handgrip 30. Thus, only the major portions of the bottle 6''' and the die 10''' of the present embodiment are designated by the same reference characters with those of FIGS. 5 and 6, and the description as to the other portions is omitted.

Figure 9:
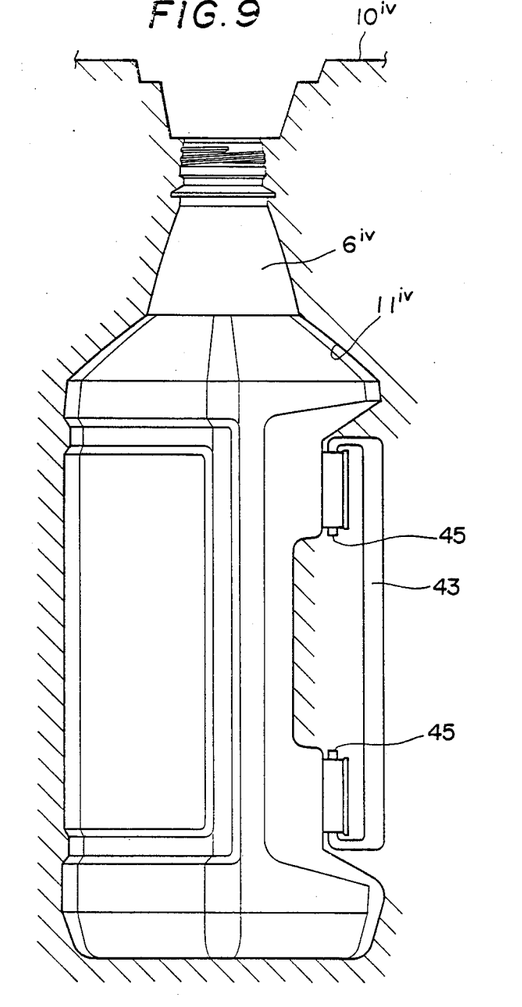
FIGS. 9 and 10 are similar views to those of FIGS. 5 and 6 illustrating yet further modified embodiments of the present invention, respectively.
Figure 10:
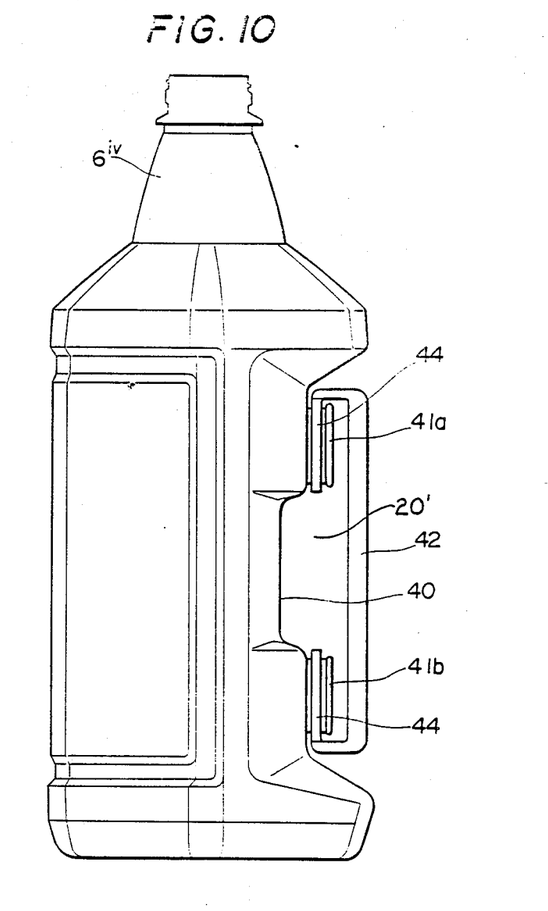

FIGS. 9 and 10 illustrate a still further modified embodiment wherein a bottle main body $6^{iv}$ has a concavity 20' for inserting user's fingers on a side thereof as mentioned above, besides the bottle is provided with handgrip supporting portions on the upper and lower positions with respect to said concave.

In the present embodiment, button-like projections 41a and 41b formed protrusively on the upper and lower portions with respect to the concavity 20' defined on the side of the bottle main body $6^{iv}$ compose handgrip attaching sections wherein resin channels 45 and 45 for forming the handgrip attaching sections 44 and 44 communicating with a resin channel 43 for forming a handgrip 42 surround completely the base portions of said projections 41a and 41b, respectively, as in the previous embodiments. Concavity 20' has an extra deep recess 40 between button-like projections 41a, 41b. The construction other than those described above in the present embodiment is similar to those of FIGS. 5 and 6, so that the major portions of the bottle and the die of the present embodiment are designated by the same reference characters with those of FIGS. 5 and 6, and the explanation therefor is omitted.

Figure 11:
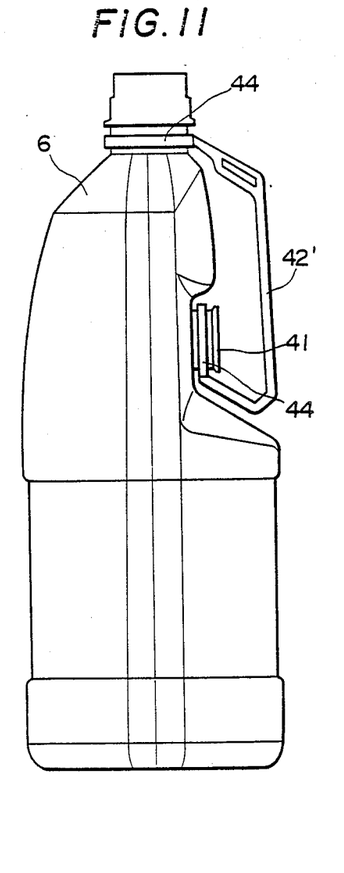
FIGS. 11, 12 and 13 are front views each showing yet another series of modified embodiments of a bottle furnished with a handgrip according to the present invention.
Figure 12:
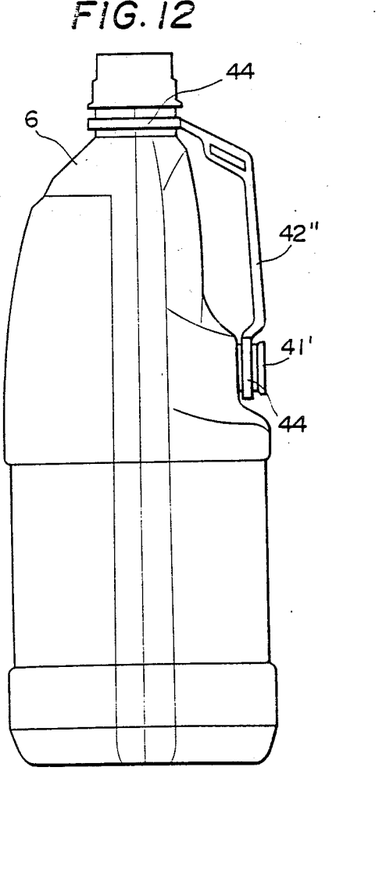
Figure 13:
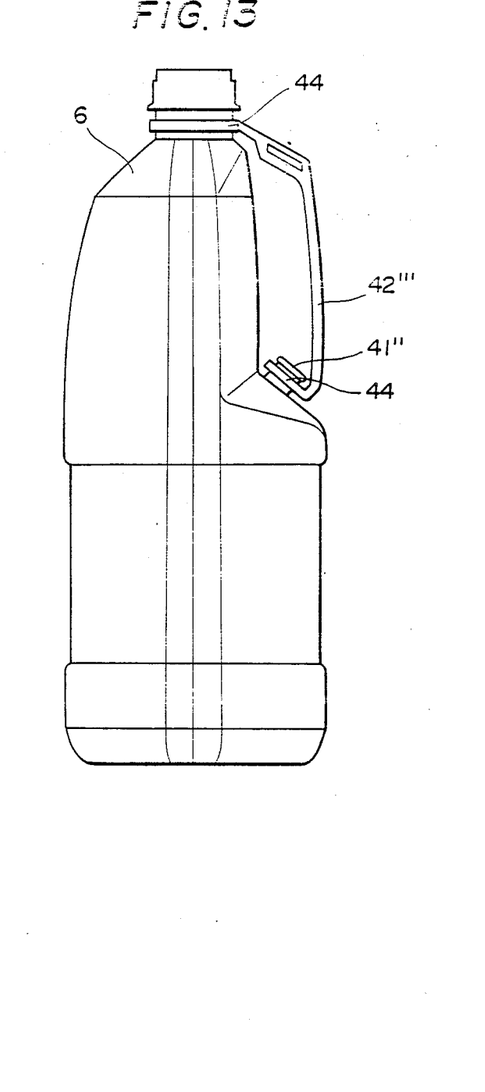

Furthermore, as shown in FIGS. 11, 12 and 13, such modifications of handgrips 42', 42'' and 42''' each of which is provided with one of said button-like projections 41', 41'' and 41''' well as another attaching section 44 on the neck of a bottle main body may be also attained.

In the present invention, the following conditions are the most preferable in respect of the internal pressure of a bottle and the injecting resin pressure. Namely, in the injection molding, an internal pressure of $P_1 = 20 \sim 40$ kg/cm$^2$ is applied to the bottle 6, an injecting resin pressure is within a range of $P_2 = 20 \sim 30$ kg/cm$^2$, and further the pressures $P_1$ and $P_2$ are to be maintained with a mutual relationship $P_1 \geq P_2$.

In the case of an internal pressure of less than 20 kg/cm$^2$, rigidity of the bottle becomes insufficient and burr due to injection of resin produces easily at particularly a thin wall portion of the bottle, whilst there is such an undesirable case where danger in operation increases in case of an internal pressure of more than 40 kg/cm$^2$.

Moreover, when an injecting resin pressure for handgrip is 20 kg/cm$^2$ or less, there is a fear of producing defective handgrip because flow of the resin lacks smoothness, whilst when exceeded 30 kg/cm$^2$, there was a case where burr was easily produced as mentioned above.

Figure 14:
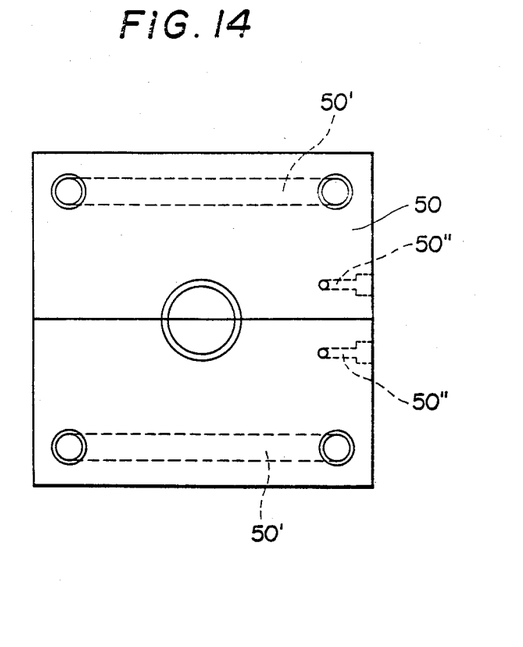
FIG. 14 is a planar view showing a split-cavity mold used in the present invention.

In this connection, it is preferable to cool a split-cavity mold 50 in case of injection molding, for example, as shown in FIG. 14.

More specifically, cooling water channels 50', 50', .... are defined over substantially overall height of bottles which are communicated with each other by combining each set of bottles as a pair at the four corners of the split-cavity mold 50, and further similar channels 50'' and 50'' are defined over the whole length of a handgrip in a direction of the height thereof in the vicinity of said handgrips, and cooling water is allowed to pass through these channels 50', 50', . . . as well as 50'' and 50''.

A temperature of the cooling water to be circulated is preferable in a range of about 5°~20° C. According to such circulation of cooling water, rigidity of a bottle increases in case of the injection thereof, and occurence of a clearance defined between a bottle and said split-cavity mold is prevented to remarkably decrease production of burr. Furthermore, cooling effects of such handgrip increase so that its molding cycle can be shortened.

Because of a certain temperature of the cooling water as described above, sweating in a molding die can be also prevented, and bottle fog due to adhesion of moisture to the bottle is prevented, whereby deterioration in quality of products is avoided.

Next, an actual molding embodiment will be described hereinbelow.

The bottle furnished with handgrip having 3.2 l capacity and shown in FIG. 2 was molded by using polyethylene terephthalate (PET-TR 8580 commercially available from Teijin Co., Ltd.) as a material for the bottle and polypropylene (Noprene BC-3E commercially available from Mitsubishi Petrochemical Co.

Ltd.) as a material for handgrip in accordance with the following condition:

| Molding machine: ASB-AI-5 type (commercially available from Nissei ASB Machine Co., Ltd.) | | |
| --- | --- | --- |
| Blow molding pressure of bottle (biaxial) | 30 | kg/cm$^2$ |
| Amount of internal pressure applied to bottle | 25 | kg/cm$^2$ |
| A temperature of injecting resin | 239° | C. |
| Injection pressure | 20 | kg/cm$^2$ |
| A temperature of cooling water | 17° | C. |

The above mentioned burr was scarcely observed on the resulting bottle, besides no abnormality was also observed on the molded articles, and particularly on handgrip portions and the like.

We claim:

1. A synthetic resin bottle with a handgrip, comprising:
    a hollow, molded, biaxially oriented, synthetic resin main body, said main body including a top, middle, and bottom portion;
    a concavity defined in said middle portion of said main body for receiving a handgrip therein;
    at least one button-like projection integrally attached to said main body in said concavity, said at least one button-like projection having a first and second subportion, said first subportion being integrally attached to said main body, said first subportion having a longitudinal axis extending substantially perpendicular to the longitudinal axis of said main body, said second subportion being integrally attached to said first subportion, said second subportion being substantially disk-shaped and extending substantially parallel to the longitudinal axis of said main body, and said second subportion having a substantially larger outer periphery than the outer periphery of said first subportion for attaching a handgrip to said main body; and
    an injection molded handgrip attached to said at least one button-like projection, said injection molded handgrip being separately injection molded relative to said synthetic resin main body by a fluid injected resin, attaching means on said handgrip injection molded around said first subportion of said button-like projection and completely encircling said first subportion by means of the fluidity of said fluid injected resin when said handgrip is separately injection molded relative to said main body, said attaching means having a predetermined shape for engaging said second subportion for preventing said second subportion of said button-like projection from passing thereby for retaining said attaching means on said first subportion between said main body and said second subportion for attaching said handgrip to said main body.

2. A synthetic resin bottle with a handgrip, comprising:
    a hollow, molded, biaxially oriented, synthetic resin main body, said main body including a top, middle, and bottom portion;
    a neck integrally attached to said top portion of said main body;
    a first handgrip attaching means defined in said neck;
    a concavity defined in said middle portion of said main body for receiving a handgrip therein;
    a second handgrip attaching means integrally attached to said main body in said concavity; and
    an injection molded handgrip having a first and second end, said injection molded handgrip being separately injection molded relative to said synthetic resin main body by a fluid injected resin, said first end of said handgrip being attached to said first handgrip attaching means in said neck, said first end of said handgrip being molded around said first handgrip attaching means in said neck and completely encircling a portion of said neck by means of the fluidity of said fluid injected resin when said handgrip is separately injection molded relative to said main body, and said second end of said handgrip being attached to said second handgrip attaching means in said concavity.

3. A device as in claim 2, wherein said second handgrip attaching means includes at least one button-like projection integrally attached to said main body in said concavity, said at least one button-like projection has a first and second subportion, said first subportion is integrally attached to said main body, said second subportion is integrally attached to said first subportion, and said second subportion has a substantially larger outer periphery than the outer periphery of said first subportion for attaching said handgrip to said main body.

* * * * *